J. F. MERRIGAN.
GLASS WASHER.
APPLICATION FILED MAY 26, 1913.

1,140,698.

Patented May 25, 1915.

Witnesses:
N. C. Lombard
Edward F. Allen.

Inventor:
James F. Merrigan,
by Walter E. Lombard
Atty.

UNITED STATES PATENT OFFICE.

JAMES F. MERRIGAN, OF BOSTON, MASSACHUSETTS.

GLASS-WASHER.

1,140,698.

Specification of Letters Patent. Patented May 25, 1915.

Application filed May 26, 1913. Serial No. 770,063.

*To all whom it may concern:*

Be it known that I, JAMES F. MERRIGAN, a citizen of the United States of America, and a resident of Boston, in the county of Suffolk and State of Massachusetts, have invented certain new and useful Improvements in Glass-Washers, of which the following is a specification.

This invention relates to improvements in devices for washing drinking glasses or tumblers, and is more especially designed for use in connection with an ordinary sink, the device being portable and adapted to be clamped to the sink, while the flexible supply tube may be connected with any ordinary faucet of a water pipe.

The invention consists in certain novel features of construction and arrangement of parts which will be fully understood by reference to the description of the drawings and to the claim hereinafter given.

Figure 1:
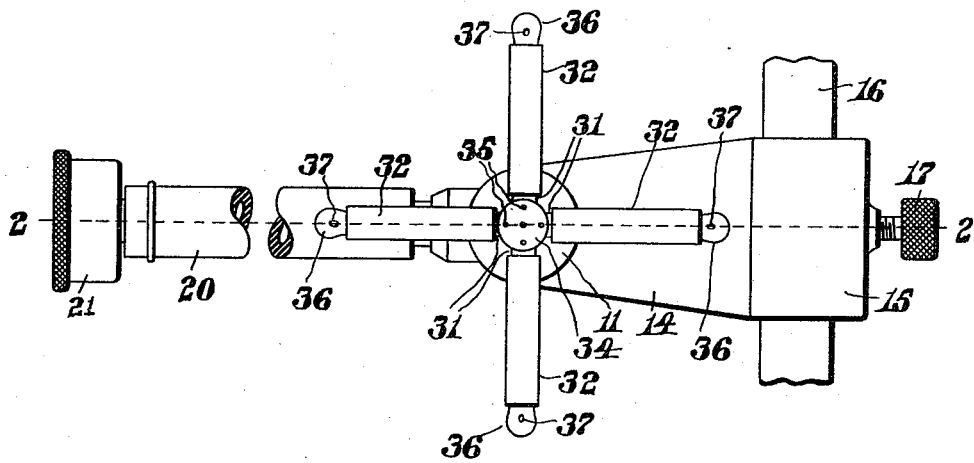
Figure 2:
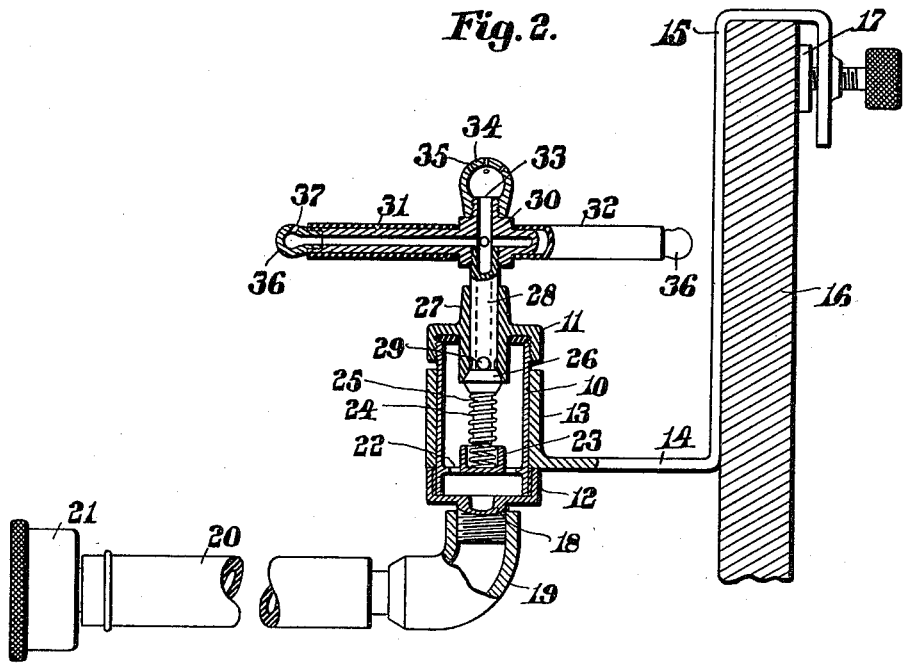

Of the drawings: Figure 1 represents a plan of a device embodying the features of the present invention, and Fig. 2 represents a vertical section of the same, the cutting plane being on line 2—2 on Fig. 1.

Similar characters designate like parts throughout the drawings.

In the drawings, 10 represents a valve casing having an interior chamber, said casing having threaded to one end thereof a cap 11 and to the opposite end thereof an annular closing member 12. Interposed between the members 11 and 12 is a tubular hub 13 formed upon or secured to a support 14 terminating in the hook portion 15 adapted to be placed over the wall 16 of an ordinary sink. The extreme end of the hook member 15 has threaded thereto a clamping member 17 by which the support 14 may be securely clamped in position. The annular closing member 12 is provided with a nipple 18 to which is threaded a pipe section 19 to the outer end of which is secured one end of the flexible hose 20, the other end of said hose being provided with a coupling member 21 adapted to be threaded to a faucet of any suitable water supply. In the interior chamber of the casing 10 is a perforated partition 22 having a cup-shaped portion 23 adapted to position the end of a spring 24 inclosed within said chamber and surrounding the stem 25 of a valve 26 seated in the end of the tubular hub 27 of the cap 11. Normally the spring 25 retains the valve 26 on its seat. Fitting the interior bore of the hub 27 is a tubular extension 28 formed on said valve 26, the lower end of said extension being provided with inlet openings 29 communicating with the interior thereof as indicated in Fig. 2. The upper end of the tubular extension 28 has threaded thereto the member 30 provided with radiating tubular arms 31, each arm being surrounded by a yielding tube 32 of rubber or some other resilient material. From the upper end of the member 30 in alinement with the extension 28 extends a nipple 33 having threaded thereto a perforated chambered member 34 provided with outlet passages 35 radiating from the center thereof. Threaded to the end of each tubular arm 31 is a chambered member 36 provided with an inclined outlet 37 therefrom, said outlet being of such an angle as to discharge the water passing therefrom onto portions of the outer wall of an inverted glass or tumbler resting on said arms 31, the water thus discharged being directed at points intermediate the ends thereof. When the glass is inverted upon the arm 31 a slight pressure downward on the glass or tumbler will cause the valve 26 to be opened, compressing the spring 24 in so doing, and thus permitting the water to pass from the faucet through the flexible hose into the interior of the casing 10 and then through the tubular extension 28 and through the tubular arms 31 and nozzle members 36, while a portion of said water is directed through the nipple 33 and then through the discharge openings 35 into the interior of the tumbler or glass, thereby thoroughly washing the same.

The resilient tubular members 32 prevent the glasses from being nicked when they are inverted and pressed downwardly on said arms to open the valve 26.

It is obvious that the flexible inlet hose 20 may be connected to any water faucet and by means of the hook 15 and clamping member 17, the device itself may be supported at any convenient point in an ordinary sink.

This makes a very convenient form of portable device for washing tumblers and glasses, especially adapted for use in bar-rooms.

It is believed that from the foregoing description the operation and many advantages of this invention will be fully understood.

Having thus described my invention, I claim:

In a portable device for washing tumblers, the combination of a cylindrical member; means for clamping said member to the inner face of the wall of a receptacle; a cylindrical casing positioned in said cylindrical member and provided with a perforated partition having a central depression; a flexible tubular member extending from said casing provided with means for connecting with a service faucet; a cap for said casing provided with a central tubular hub extending into said casing and terminating in a valve seat; a tubular valve member reciprocable in said hub and provided with a stem; a spring surrounding said stem and resting in said depression adapted to retain said valve on its seat; and tumbler supporting arms secured to said tubular valve and provided with passages therethrough communicating with said valve and adapted to eject water upon the interior or exterior of the tumbler supported on said arms.

Signed by me at 4 Post Office Sq., Boston, Mass., this 23rd day of May, 1913.

JAMES F. MERRIGAN.

Witnesses:
WALTER E. LOMBARD,
NATHAN C. LOMBARD.

Copies of this patent may be obtained for five cents each, by addressing the "Commissioner of Patents, Washington, D. C."